(12) United States Patent  
Umezawa

(10) Patent No.: US 8,363,287 B2
(45) Date of Patent: Jan. 29, 2013

(54) IMAGE READING APPARATUS AND IMAGE READING METHOD

(75) Inventor: Hiroaki Umezawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 993 days.

(21) Appl. No.: 12/403,046

(22) Filed: Mar. 12, 2009

(65) Prior Publication Data

US 2009/0231638 A1    Sep. 17, 2009

(30) Foreign Application Priority Data

Mar. 17, 2008   (JP) .................. 2008-068437

(51) Int. Cl.
  *H04N 1/04* (2006.01)
  *H04N 1/40* (2006.01)
  *H04N 1/00* (2006.01)

(52) U.S. Cl. ........ 358/474; 358/496; 358/488; 358/486; 358/444; 358/404; 358/403; 358/408

(58) Field of Classification Search .............. None
  See application file for complete search history.

(56) References Cited

U.S. PATENT DOCUMENTS

| | | | | |
|---|---|---|---|---|
| 6,075,622 A * | 6/2000 | Hadgis et al. | ................. | 358/474 |
| 6,249,359 B1 * | 6/2001 | Aoki et al. | ................... | 358/473 |
| 6,665,088 B1 | 12/2003 | Chiba et al. | | |
| 7,268,909 B2 * | 9/2007 | Nakagiri | ...................... | 358/1.16 |
| 7,884,975 B2 | 2/2011 | Uku | | |
| 8,072,652 B2 * | 12/2011 | Yamada | ........................ | 358/474 |
| 8,159,710 B2 * | 4/2012 | Sakurai | ........................ | 358/1.16 |

FOREIGN PATENT DOCUMENTS

| | | |
|---|---|---|
| JP | 05-183674 | 7/1993 |
| JP | 11-177747 | 7/1999 |
| JP | 2001-026151 | 1/2001 |
| JP | 2005-242917 | 9/2005 |
| JP | 2005-348376 | 12/2005 |
| JP | 2006-295546 | 10/2006 |
| JP | 2007-081687 | 3/2007 |
| JP | 2007-143014 | 6/2007 |

* cited by examiner

*Primary Examiner* — Cheukfan Lee
(74) *Attorney, Agent, or Firm* — Dickstein Shapiro LLP

(57) ABSTRACT

An image reading apparatus having a memory to store therein image data acquired by reading an original is provided. In a regular reading mode, the memory is divided into a first buffer that stores therein first image data of an image of a first side of the original and a second buffer that stores therein second image data of an image of a second side of the original. In a ring buffer mode, only the first image data is stored in the first buffer and the second buffer in a seamless manner, and the first image data stored in the buffers is output from the buffers to an image processing unit through an output path in a parallel manner. When a size of an original to be read is larger than a predetermined size, reading is performed in the ring buffer mode.

10 Claims, 7 Drawing Sheets

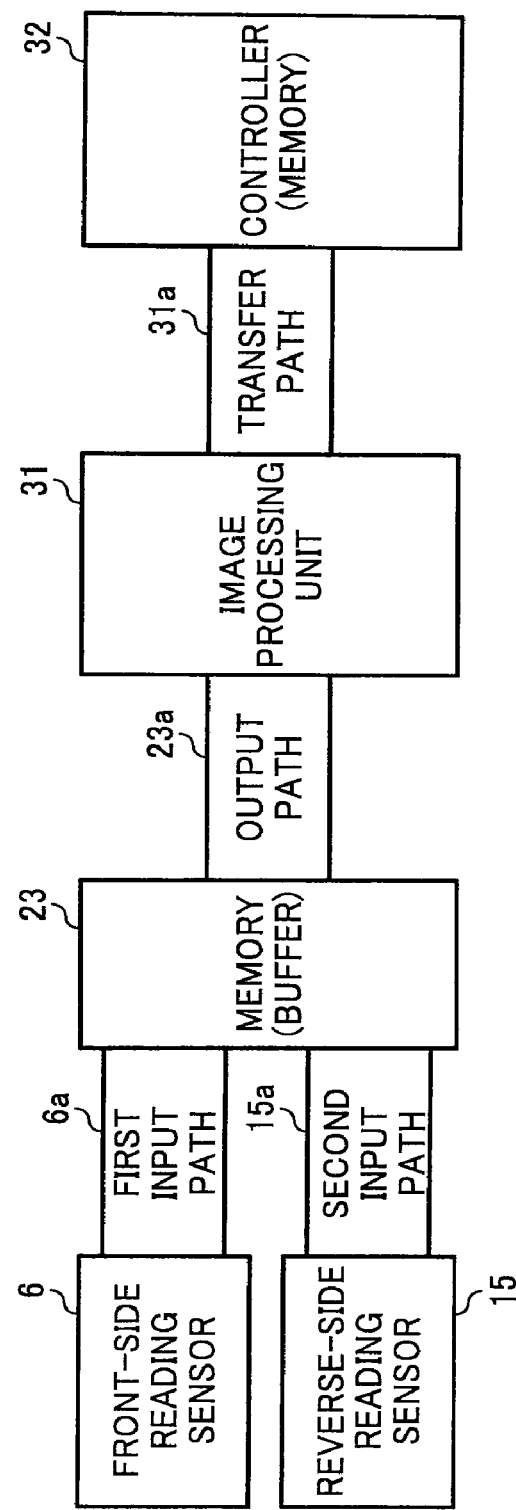

IMAGE READING APPARATUS AND IMAGE READING METHOD

CROSS-REFERENCE TO RELATED APPLICATIONS

The present application claims priority to and incorporates by reference the entire contents of Japanese priority document 2008-068437 filed in Japan on Mar. 17, 2008.

BACKGROUND OF THE INVENTION

1. Field of the Invention

The present invention is directed to a technology related to temporarily storing of read image data.

2. Description of the Related Art

Image reading apparatuses that can read images of two sides of an original simultaneously are known in the art. Such image reading apparatuses typically have a memory and temporarily store read image data in the memory before outputting the image data. Such image reading apparatuses have been disclosed in, for example, Japanese Patent Application Laid-open No. 2006-295546, Japanese Patent Application Laid-open No. 2007-081687, and Japanese Patent Application Laid-open No. 2005-242917.

Japanese Patent Application Laid-open No. 2006-295546 teaches using a read-page memory area for storing therein scanned image data of an original and an output-page memory area for storing therein image data to be output. When images of two sides of a two-sided original are to be read, image data of a first side of the original is stored in the read-page memory area whereas image data of a second side is stored in the output-page memory area.

The technology disclosed in Japanese Patent Application Laid-open No. 2007-081687 is directed to an image reading apparatus that is connected to an external apparatus and is capable of reading an image of a first side of an original and that of a second side at one time. The image reading apparatus includes an image sensor, an analog-digital (A/D) converter, an image processing unit, a parameter setting unit, and a communication unit. Images acquired by reading two sides of a two-sided original are converted into electric image signals by the image sensor. The electric image signals are converted into digital signals by the A/D converter, and then subjected to digital signal processing by the image processing unit. The processed digital image data is sent to the external apparatus by the communication unit. When reading images of two sides of an original at one time, an image of a first side of the original and that of a second side are read differently according to corresponding reading-related parameters that have been determined by a user on a side-by-side basis in advance.

The technology disclosed in Japanese Patent Application Laid-open No. 2005-242917 is directed to an image reading apparatus that includes a storage device. The storage device includes a primary storage unit for temporarily storing therein image data of at least one image and a secondary storage unit for storing therein the image data temporarily stored in the primary storage unit. The image reading apparatus is connectable to a two-sided original reading apparatus that is capable of reading an image of a first side of a two-sided original and that of a second side simultaneously. The image reading apparatus includes a data transfer unit and a data-transfer-rate determining unit. The data transfer unit is capable of transferring image data of the two images, i.e., the image of the first side and that of the second side, substantially simultaneously to the storage device. The data-transfer-rate determining unit determines a transfer rate for the image data of the first side and a transfer rate for the image data of the second side. When transferring these two sets of the image data acquired by the two-sided original reading apparatus to the storage device, the image data are transferred at the transfer rates determined by the data-transfer-rate determining unit.

As disclosed in Japanese Patent Application Laid-open No. 2006-295546, a typical image reading apparatus capable of reading images of two sides of a two-sided original includes a memory for temporarily storing image data therein for a reading mechanism (scanner). Even when images of two sides of an original are read by the image reading apparatus simultaneously to acquire image data of the two images, it is necessary to transfer the image data on a side-by-side basis to a controller. When the image data is to be subjected to image processing, the image processing is also performed on the image data on a side-by-side basis. To adjust timing related to the transfer or the image processing, system control of temporarily storing the image data in the memory or the like is performed. With the method disclosed in Japanese Patent Application Laid-open No. 2006-295546, even when an image of an original that is longer than a predetermined size is read and image data, which is therefore large in size, is acquired, all the image data is temporarily stored in such a memory of the scanner. After all the image data has been stored in the memory, the image data is transferred to the controller. If the size of the image data is larger than the capacity of the memory, the image data will be damaged. One approach could be to use a sufficiently large memory; however, a larger memory is disadvantageously expensive.

SUMMARY OF THE INVENTION

It is an object of the present invention to at least partially solve the problems in the conventional technology.

According to an aspect of the present invention, there is provided an image reading apparatus including a first image sensor configured to read an image of a first side of an original thereby acquiring first image data, and a second image sensor configured to read an image of a second side of the original thereby acquiring second image data, reading of the image of the first side of an original by the first image sensor and reading of the image of the second side of the original by the second image sensor can be performed simultaneously; a storage unit that temporarily stores therein the first image data and the second image data; a first input path through which the first image data acquired by the first image sensor is output to the storage unit, and a second input path through which the second image data acquired by the second image sensor is output to the storage unit; an output path through which the first image data and the second image data are output from the storage unit to an image processing unit. When a size of the original is equal to or smaller than a predetermined size, reading of the original is performed in a regular reading mode in which the first image data is stored in a first storage area of the storage unit though the first input path and the second image data is stored separately in a second storage area of the storage unit though the second input path, and when the size of the original is larger than the predetermined size, reading of the original is performed in a ring buffer mode in which only the first image data is stored in one storage area composed of the first storage area and the second storage area in a seamless manner through the first input path, wherein storing of the first image data in the one storage area and outputting of the first image data from the one storage area to the image processing unit through the output path is performed in a parallel manner.

According to another aspect of the present invention, there is provided an image reading method implemented in an image reading apparatus, the image reading apparatus including a first image sensor configured to read an image of a first side of an original thereby acquiring first image data, and a second image sensor configured to read an image of a second side of the original thereby acquiring second image data, reading of the image of the first side of an original by the first image sensor and reading of the image of the second side of the original by the second image sensor can be performed simultaneously; a storage unit that temporarily stores therein the first image data and the second image data; a first input path through which the first image data acquired by the first image sensor is output to the storage unit, and a second input path through which the second image data acquired by the second image sensor is output to the storage unit; an output path through which the first image data and the second image data are output from the storage unit to an image processing unit. The image reading method includes, when a size of the original is equal to or smaller than a predetermined size, performing reading of the original in a regular reading mode in which the first image data is stored in a first storage area of the storage unit though the first input path and the second image data is stored separately in a second storage area of the storage unit though the second input path, and when the size of the original is larger than the predetermined size, performing reading of the original in a ring buffer mode in which only the first image data is stored in one storage area composed of the first storage area and the second storage area in a seamless manner through the first input path and storing of the first image data in the one storage area and outputting of the first image data from the one storage area to the image processing unit through the output path is performed in a parallel manner.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a block diagram for explaining various functional components of the image reading apparatus depicted in FIG. 1;

DETAILED DESCRIPTION OF THE PREFERRED EMBODIMENTS

Exemplary embodiments of the present invention are described in detail below with reference to the accompanying drawings.

Figure 1:
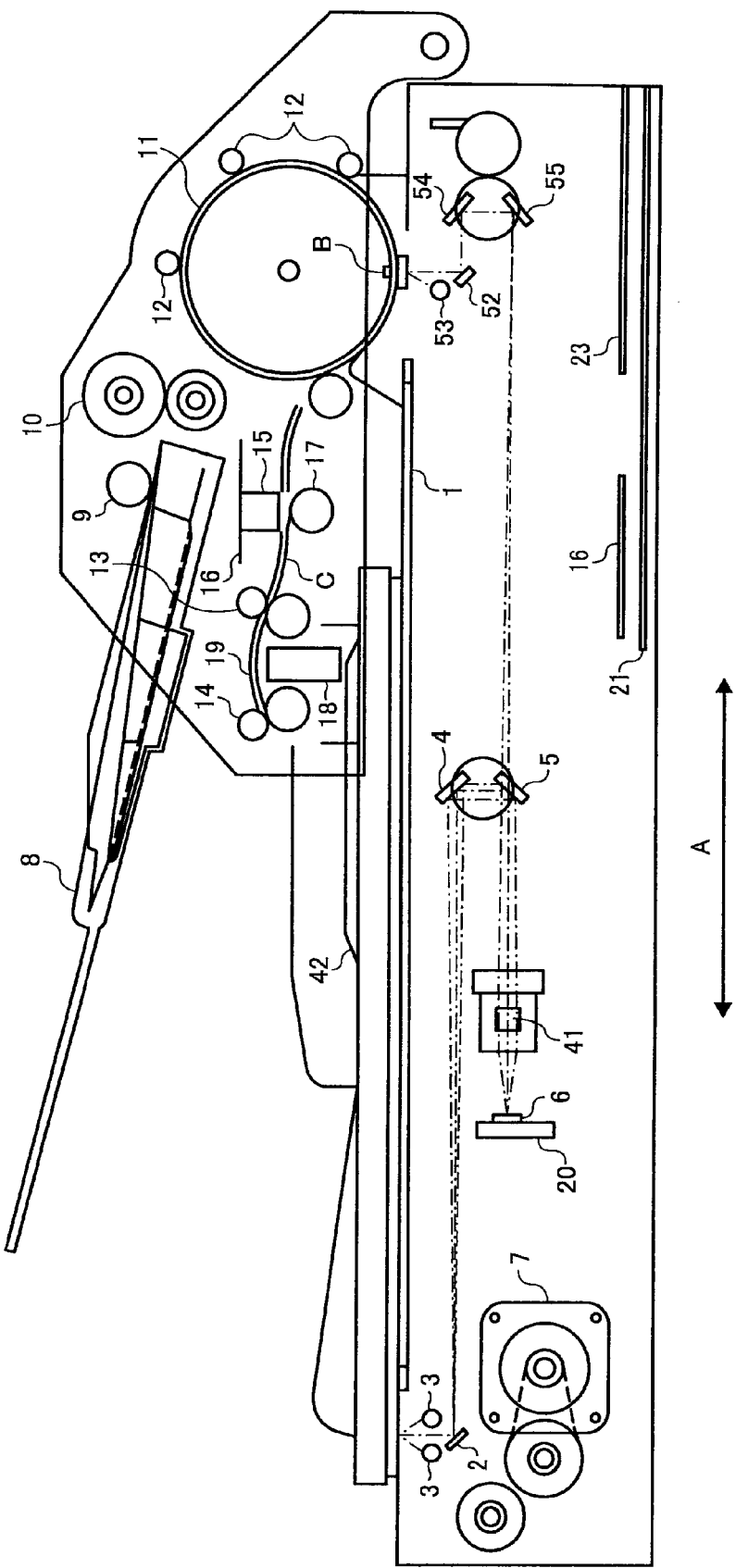
FIG. 1 is a schematic side view of an image reading apparatus according to an embodiment of the present invention.

FIG. 1 is a schematic side view of an image reading apparatus according to an embodiment of the present invention. The image reading apparatus is capable of reading an original in any one of a flatbed configuration and an automatic document feed configuration. In the flatbed configuration, the image reading apparatus reads an image of a fixed original while the image reading apparatus reads an image of an original being conveyed in the automatic document feed configuration. In the flatbed configuration, an original placed on an exposure glass 1 is illuminated by illumination lamps 3. The illumination lamps 3 are constructed integrally with a first mirror 2. A second mirror 4 is constructed integrally with a third mirror 5. Light reflected by the original is further reflected from the first mirror 2, the second mirror 4, and the third mirror 5. A drive motor 7 drives the first mirror 2, the illumination lamps 3, the second mirror 4, and the third mirror 5 so as to move them in the direction indicated by an arrow A in FIG. 1 so that light reflected from the third mirror 5 moves in a scanning motion. The reflected light is converged by a lens 41 to a charged couple device (CCD) 6 where the light is subjected to photoelectric conversion.

In the automatic document feed configuration, an original placed on an original table 8 is fed by a pickup roller 9, a pair of registration rollers 10, a conveying drum 11, and support rollers 12 to a reading position B, and then conveyed by a pair of conveying rollers 13 and a pair of delivery rollers 14 onto an output table 42. When the original passes by the reading position B, an illumination lamp 53 arranged near the reading position B illuminates a first side (front side) of the original with light. Light reflected from the first side of the original is further reflected from a first mirror 52, a second mirror 54, and a third mirror 55 to cause the light to move in a scanning motion. The second mirror 54 is constructed integrally with the third mirror 55. The reflected light is converged by the lens 41 to the CCD 6 where the light is subjected to photoelectric conversion. The pickup roller 9 and the registration rollers 10 are driven by a sheet feed motor (not shown). The conveying drum 11, the support rollers 12, the conveying rollers 13, and the delivery rollers 14 are driven by a conveying motor (not shown).

In the automatic feed configuration, a contact image sensor (CIS) 15 is arranged at a reading position C. The CIS 15 includes a lens (not shown), a sensor (not shown), and a lamp (not shown) serving as a light source. The lamp is, for example, a light-emitting diode (LED). When the original passes by the reading position C, the LED of the CIS 15 illuminates a second side (reverse side) of the original. Light reflected from the second side is converged by the lens of the CIS 15 to the sensor of the CIS 15 where the light is subjected to photoelectric conversion. A white roller 17 is arranged to face the CIS 15 with a conveying path of the original therebetween. The white roller 17 functions as a white reference member in shading correction that is performed on image data acquired by using the CIS 15. An endorser unit 18 and an endorser platen 19 are arranged downstream of the conveying rollers 13 and upstream of the delivery rollers 14. The endorser unit 18 includes a printing unit (not shown) and a pressure solenoid (not shown). The printing unit includes alphanumeric stamps impregnated with ink. The pressure solenoid applies a pressure onto the printing unit toward the endorser platen 19. An alphanumeric letter can be printed on an original by causing the original to be temporarily stopped on the endorser unit 18, holding the original with the endorser platen 19 in the direction of the pressure, and urging the printing unit toward the endorser platen 19 with the original therebetween.

A sensor board unit (SBU) 20 is arranged at the position of the CCD 6. The light reflected from the original falls on the CCD 6 where the light is converted into an analog image signal whose voltage level represents an optical intensity of the light. The analog image signal is output while being divided into odd bits and even bits. After undergone darkcurrent compensation in an analog processing circuit (not shown) in the SBU 20, the odd bits and the even bits are put together. After the gain of the analog image signal is adjusted to a predetermined frequency, the analog image signal is input to the A/D converter where the analog image signal is converted into a digital image signal.

The digital image signal is subjected to the shading correction, gamma correction, a modulation transfer function (MTF) correction, and the like in an N image processing unit (NIPU) (not shown) on a scanner control unit (SCU) 21, and then converted into a binary image signal. The binary image signal is output from the NIPU together with a page synchronizing signal, a line synchronizing signal, and an image clock signal as a video signal to an optional image processing unit (IPU) (not shown) via a connector (not shown). After being subjected to predetermined image processing in the optional IPU, the video signal is returned to the SCU 21 where the video signal is input to a selector (not shown) The other input signal of the selector is the video signals output from the NIPU. Hence, the selector permits to select whether to perform the image processing on the video signal in the optional IPU. The video signal output from the selector is input to a scanner image buffer controller (SiBU) (not shown) that manages an image-data storage unit (not shown). The image-data storage unit, which is referred to as an image memory or an image data memory in this document, is assumed to be a dynamic random access memory (DRAM); however, the image-data storage unit is not limited to a DRAM. The video signal is stored in the image-data storage unit, and then fed to a small computer systems interface (SCSI) controller to be sent to an external apparatus, such as a personal computer (PC).

The analog image signal output having been subjected to photoelectric conversion in the CIS 15 is converted into a digital signal by a reverse-side sensor board unit (RSBU) 16. The digital image signal is further subjected to shading correction in the RSBU 16, and fed to a reverse-side control unit (RCU) 23. The RCU 23 includes the image memory, which is the DRAM, and the SiBC that controls the image memory. The RCU 23 temporarily stores image data in the image memory, and then outputs the image data to the SCU 21. A configuration that permits to select any one of the image data output from the RCU 23 to the SCU 21 and the image data output from the SiBU on the SCU 21 is employed so that the selected data can be output to the SCSI controller.

The SCU 21 includes a central processing unit (CPU), a read only memory (ROM), and a random access memory (RAM). The CPU controls the SCSI controller to carry out communications with an external apparatus such as a PC. The CPU also performs drive timing control of the drive motor 7, the conveying motor, and the sheet feed motor. An automaticdocument-feed control unit (ADU) (not shown) has a function of relaying electric power supply to electrical components in an automatic document feeder (ADF). An input port (not shown) on the SCU 21 that is connected to the CPU is also connected to a control panel (not shown) via an input/output board (IOB) (not shown). A start switch and an abort switch are arranged on the control panel. A CPU 37 detects that turn-on of each one of the switches in response to being pressed via the input port.

FIG. 2 is a block diagram for explaining various functional components of the image reading apparatus. The image reading apparatus includes the reading sensors (the CCD 6 and the CIS 15), the RCU 23, an image processing unit 31), and a controller 32. The CCD 6 functions as a front-side reading sensor 6, and the CIS 15 functions as a reverse-side reading sensor 15. The RCU 23 functions as a memory 23. Image data acquired by the front-side reading sensor 6 is output to the memory 23 through a dedicated first input path 6*a* while image data acquired by the reverse-side reading sensor 15 is output to the memory 23 through a dedicated second input path 15*a*. Image data stored in the memory 23 is output to the image processing unit 31 through a single output path 23*a*. Image data output from the image processing unit 31 is output to the controller 32 through a single transfer path 31*a*. In other words, while image data is input from the front-side reading sensor 6 and the reverse-side reading sensor 15 to the memory 23 through dedicated input paths, i.e., the first input path 6*a* and the second input path 15*a*, image data is output from the memory 23 through only one output path, i.e., the single output path 23*a*.

FIGS. 3A to 3F are schematic diagrams for explaining input/output of image data in/from the memory 23 upon reading images of two sides of a two-sided original of a predetermined size.

Figure 3A:
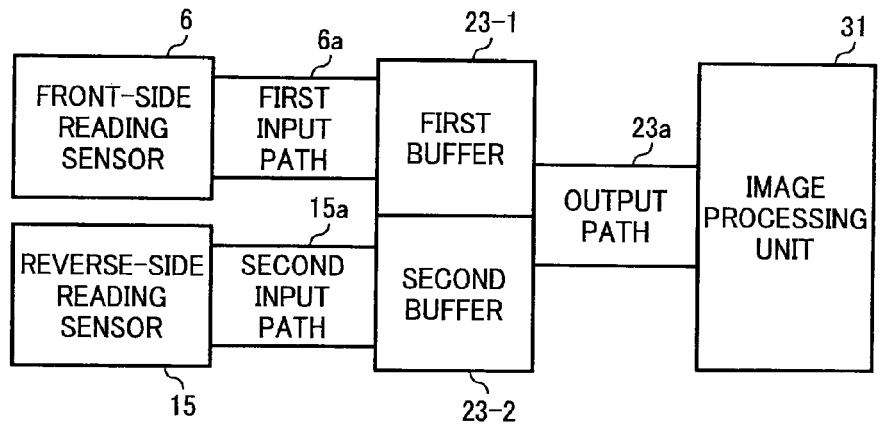
FIGS. 3A to 3F are schematic diagrams for explaining how the image reading apparatus depicted in FIG. 1 reads images of two sides of a two-sided original of a predetermine size.
Figure 3B:
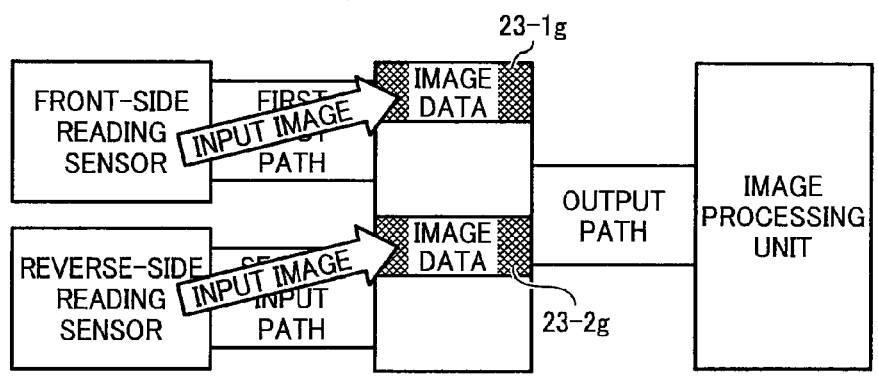
Figure 3C:
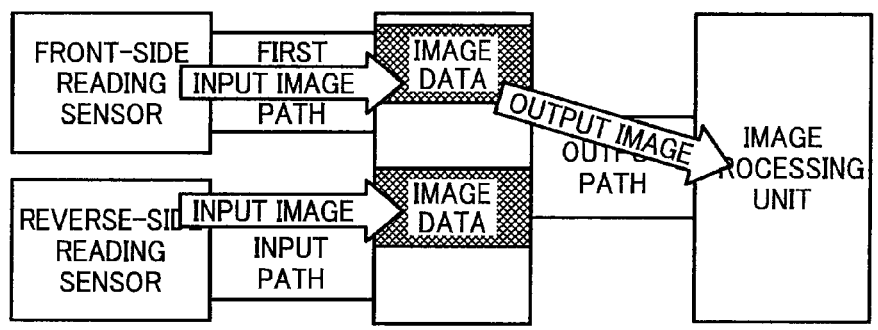
Figure 3D:
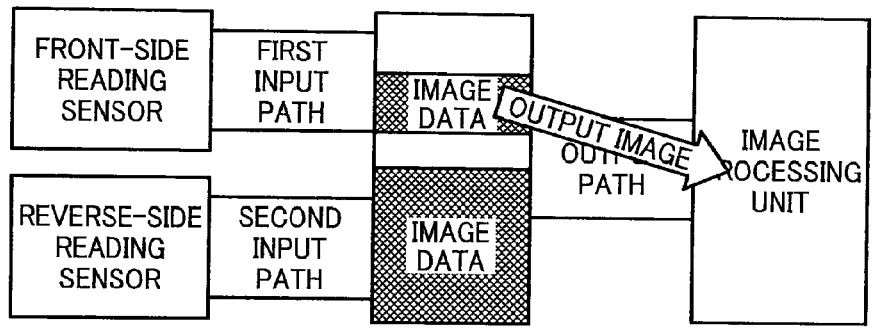
Figure 3E:
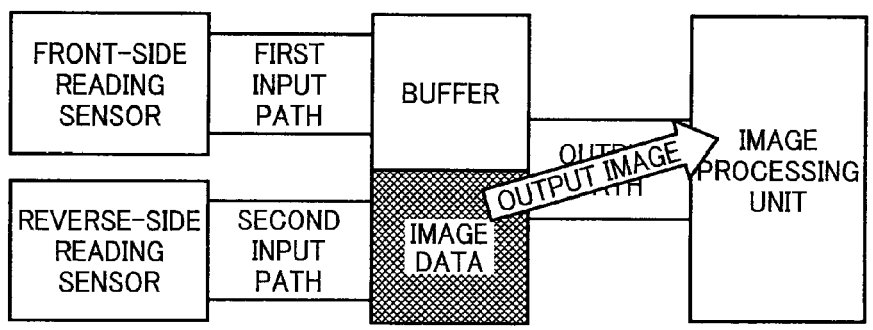
Figure 3F:
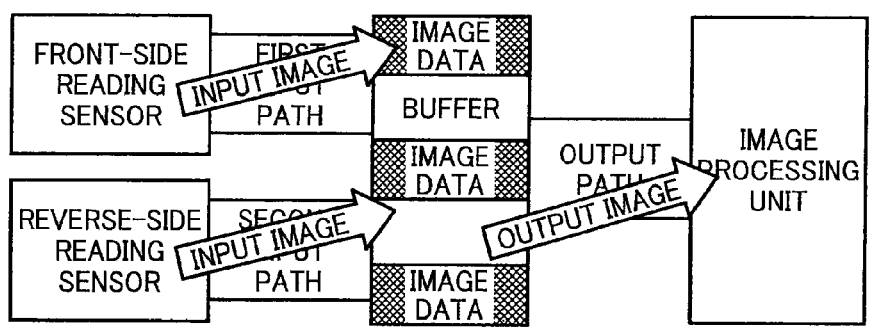

When images of two sides of an original are to be read simultaneously, as depicted in FIG. 3A, the memory 23 is divided into a first buffer 23-1 and a second buffer 23-2. Image data 23-1*g* of a first (front) side of the original is stored in the first buffer 23-1, and image data 23-2*g* of a second (reverse) side of the original is stored in the second buffer 23-2 (FIG. 3B). When an amount of the image data 23-1*g* and the image data 23-2*g* stored in the memory 23 has reached a predetermined amount, the image data 23-1*g* in the first buffer 23-1 is first output to the image processing unit 31 (FIGS. 3C and 3D). Upon completing output of the image data 23-1*g* from the first buffer 23-1 to the image processing unit 31, the image data 23-2*g* in the second buffer 23-2 is output to the image processing unit 31 (FIG. 3E). This control is performed to adjust timing for outputting image data from the memory 23 to the image processing unit 31. Adjustment of the timing is required because there are provided only one image processing unit 31 and one controller 32 to receive output from the memory 23 to reduce costs.

Figure 4:
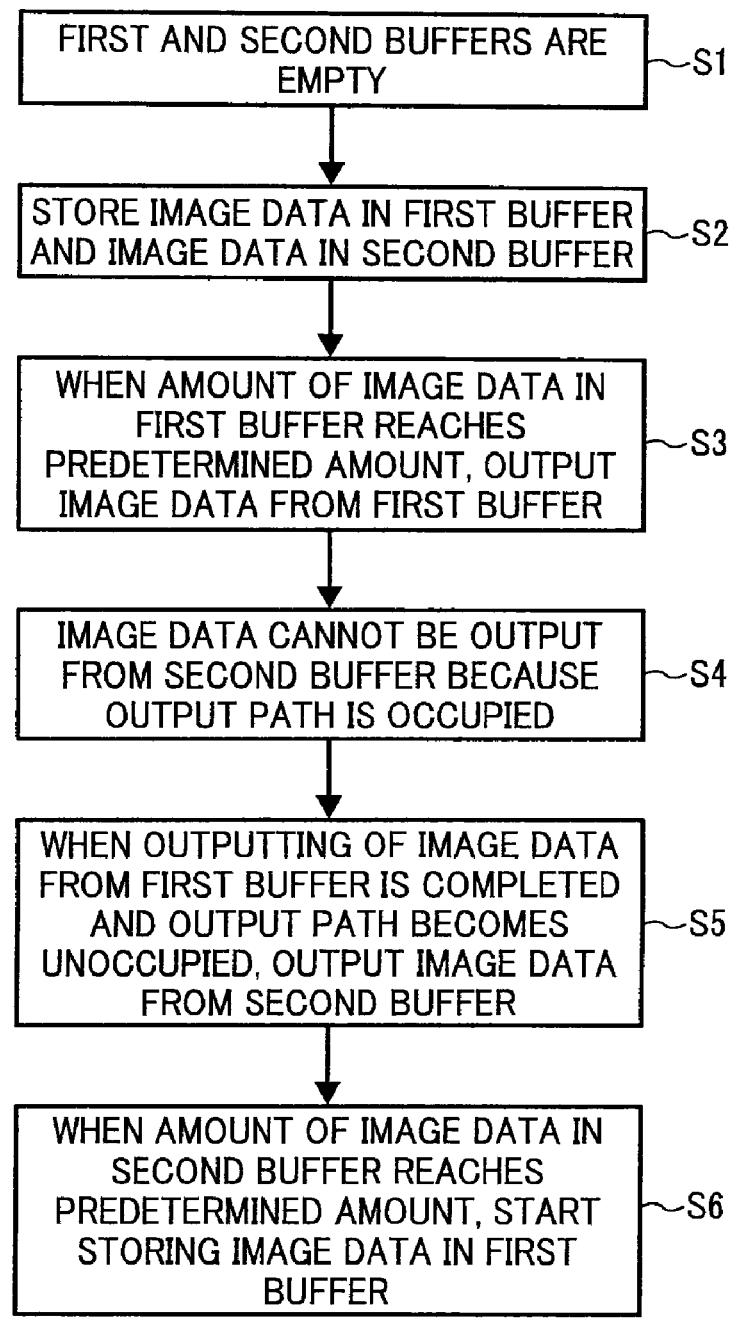
FIG. 4 is a flowchart for explaining the operations depicted in FIGS. 3A to 3F.

FIG. 4 is a flowchart for explaining how image data is output from the memory 23 depicted in FIGS. 3A to 3F. At the initial state (FIG. 3A), the first buffer 23-1 and the second buffer 23-2 are empty (Step S1). The image data 23-1*g* is stored in the first buffer 23-1 through the first input path 6*a*, and the image data 23-2*g* is stored in the second buffer 23-2 through the second input path 15*a* (Step S2, FIG. 3B). When the amount of the image data 23-1*g* stored in the first buffer 23-1 and the amount of the image data 23-2*g* stored in the second buffer 23-2 reaches the predetermined amount, the image data is output from any one of the two buffers to the image processing unit 31 (Step S3, FIG. 3C). For example, assume that the image data 23-1*g* in the first buffer 23-1 has reached the predetermined amount so that the image data 23-1*g* is first output to the image processing unit 31.

The image data 23-2*g* from the second buffer 23-2 can not be output to the image processing unit 31 because the output path 23*a* is occupied by the image data 23-1*g* that is being output from the first buffer 23-1 (Step S4, FIG. 3D). When outputting of the image data 23-1*g* from the first buffer 23-1 is completed, the output path 23*a* is not occupied any more. Hence, the image data 23-2*g* in the second buffer 23-2 is output to the image processing unit 31 through the output path 23*a* (Step S5, FIG. 3E). When an amount of the image data having been output from the second buffer 23-2 has reached a predetermined amount, storing image data of subsequent images in the first buffer 23-1 and the second buffer 23-2 is started (Step S6, FIG. 3F).

In this manner, when the original is of a predetermined size, the memory 23 is toggled between two states. In contrast, for an original whose size is larger than the predetermined size (hereinafter, "oversized original"), the memory 23 is used as a ring buffer.

FIGS. 5A to 5F are schematic diagrams for explaining input/output of image data in/from the memory 23 upon reading images of two sides of a two-sided original of an oversized original. In the present specification, this processing mode is referred to as a ring buffer mode. In the ring buffer mode, each time when an amount of image data stored in the memory 23 reaches a predetermined value, the image data is output from the memory 23. As a result, it is possible to simultaneously input/output image data to/from the memory 23. A user inputs a parameter indicating whether an original to be read is an oversized original in advance. The image reading apparatus refers to the parameter and determines whether the original to be read is an oversized original. When the parameter indicative of an oversized original is input, the memory 23 is used in the ring buffer mode in which the first buffer 23-1 and the second buffer 23-2 are regarded as a single buffer, although the memory 23 is divided in the first buffer 23-1 and the second buffer 23-2.

Figure 5A:
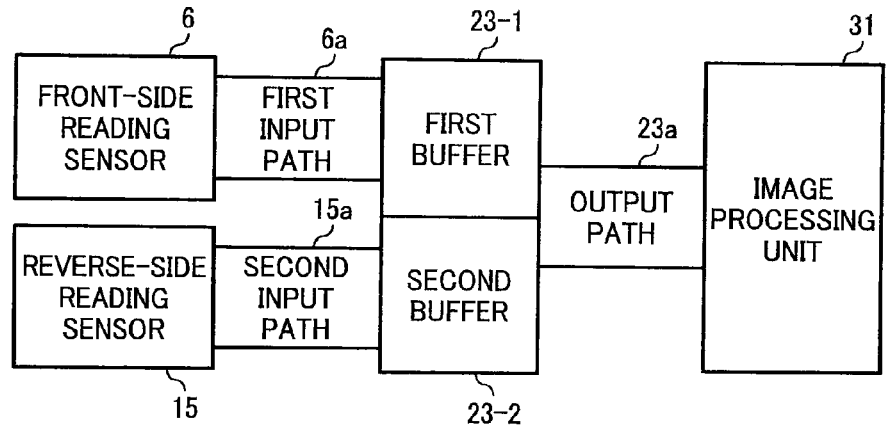
FIGS. 5A to 5F are schematic diagrams for explaining how the image reading apparatus depicted in FIG. 1 reads an image of an oversized original.
Figure 5B:
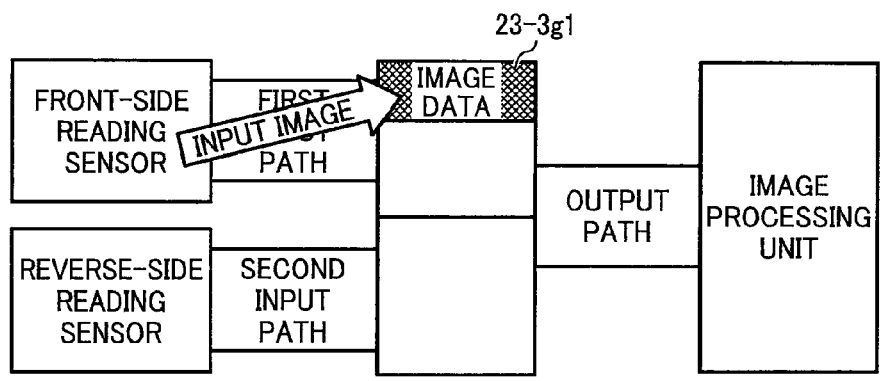
Figure 5C:
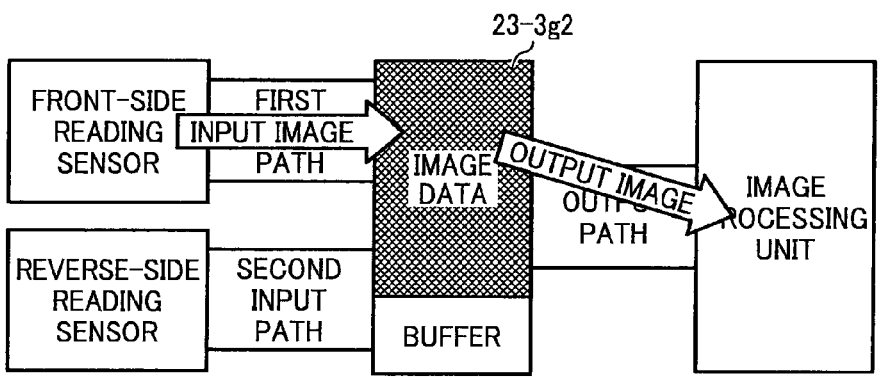
Figure 5D:
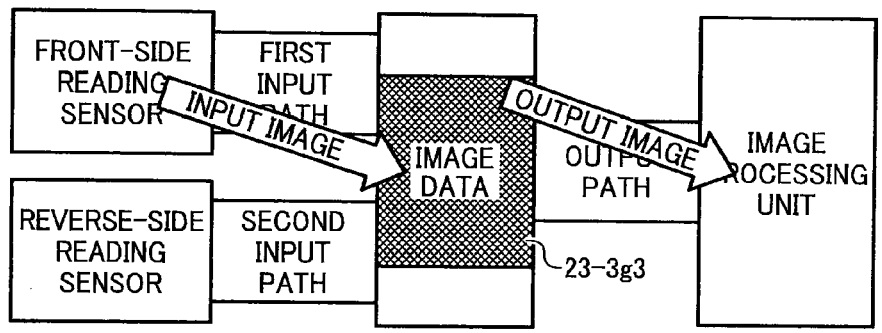

Assume that an oversized original is read and image data acquired by using the front-side reading sensor 6 are output to the first buffer 23-1 through the first input path 6a (FIGS. 5A and 5B). Image data 23-3g1 is stored in the first buffer 23-1 (FIG. 5B). Although the memory 23 is divided into the first buffer 23-1 and the second buffer 23-2, the memory 23 is used as a single buffer in the ring buffer mode. Accordingly, when the first buffer 23-1 becomes full with the image data 23-3g1, subsequent image data 23-3g2 is stored in the second buffer 23-2 in a seamless manner. When an amount of the image data 23-3g2 stored in the memory 23 reaches a predetermined amount, output of the image data from the memory 23 to the image processing unit 31 is started (FIG. 5C). While the image data is being output from the memory 23 to the image processing unit 31, new image data is output from the front-side reading sensor 6 through the first input path 6a to the first buffer 23-1 and to the second buffer 23-2. Thus, outputting of the image data 23-3g3 from the memory 23 to the image processing unit 31 is performed concurrently with storing of the new image data in the memory 23 (FIG. 5D).

Figure 5E:
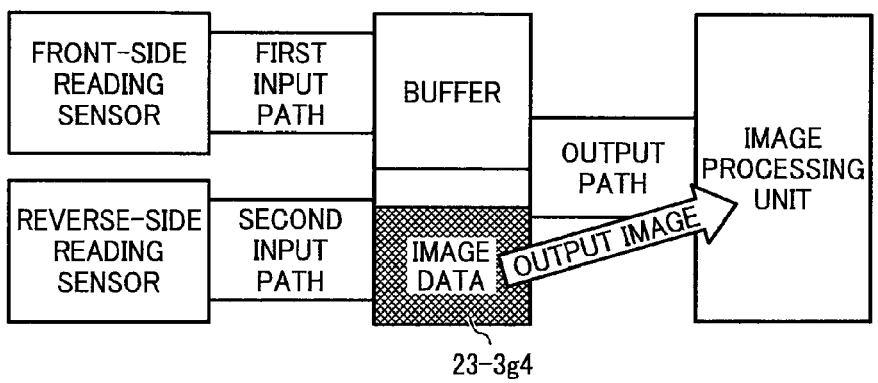
Figure 5F:
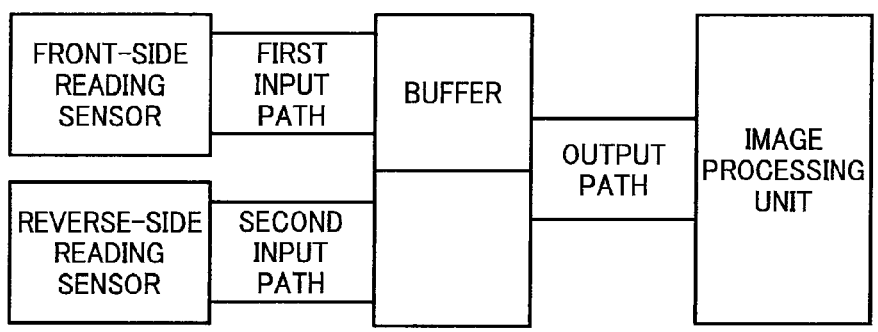

When reading of an original by using the front-side reading sensor 6 to acquire the image data is completed, storing the image data in the memory 23 is also completed. Image data 23-3g4 is output from the memory 23 to the image processing unit 31 through the output path 23a (FIG. 5E). When all the image data has been output from the memory 23, outputting of the image data is completed (FIG. 5F).

The operations explained above will be described in short.

The image reading apparatus refers to the parameter to determine whether an original to be read is an oversized original. When it is determined that the original is an oversized original, the image reading apparatus controls various units to operate in the ring buffer mode. Whereas the memory 23 is divided into the first storage area for image data acquired from a first side of the original and the second storage area for image data acquired from a second side in the regular reading mode, the entire memory 23 is used for the first side (front side) in the ring buffer mode. This is because when images of two sides of an oversized original are read, it is difficult to control timing for outputting image data of the images. Accordingly, reading of an oversized original is limited only to one side (front side) of the original. Whether an original to be read is an oversized original is determined based on the parameter that is input into the control panel.

Even with the configuration of the present embodiment, it is impossible to read two sides of a two-sided oversized original simultaneously. Hence, when it is necessary to read two sides of an oversized original simultaneously, a single memory is divided into a first storage area for a first side of the original and a second storage area for a second side as in the case of the regular reading mode. However, while reading of the first side is performed in the ring buffer mode, reading of the second side is not performed in the ring buffer mode. More specifically, in contrast to that image data about only a specified area of the second side is stored, image data about an entire area of first side is stored. Accordingly, this control permits reading also an image of a specified area of a second side.

When an attempt of outputting image data from the memory 23 is made even when no image data is stored in the memory 23 in a condition where image data is input to the memory 23 at a processing speed that differs from (faster than) a processing speed at which the image data is output from the memory 23, the image processing unit 31 undesirably receives invalid image data. When a memory control unit (not shown) detects this, the memory control unit determines that an anomalous condition has occurred and sends a notification of this effect to the controller 32. The controller 32 displays an indication of this effect on the control panel to notify a user about the anomalous condition.

As described above, the present embodiment offers following advantages:

1) Because reading can be performed in the ring buffer mode, reading of an image of an oversized original can be performed even with use of a small-capacity inexpensive memory.

2) Because it is possible to detect an anomalous condition during reading of an image of an oversized original and to issue an alarm of this effect to a user, the user can be informed of occurrence of the anomalous condition.

According to an aspect of the present invention, when an original to be read is oversized, reading an image of the original to acquire image data and storing the image data in a storage unit can be performed in the ring buffer mode. This permits to read an image of an oversized original even with use of an inexpensive memory whose capacity is relatively small.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus comprising:
a first image sensor configured to read an image of a first side of an original thereby acquiring first image data, and a second image sensor configured to read an image of a second side of the original thereby acquiring second image data, wherein reading of the image of the first side of an original by the first image sensor and reading of the image of the second side of the original by the second image sensor can be performed simultaneously;
a storage unit that temporarily stores therein the first image data and the second image data;
a first input path through which the first image data acquired by the first image sensor is output to the storage unit, and a second input path through which the second image data acquired by the second image sensor is output to the storage unit; and an output path through which the first image data and the second image data are output from the storage unit to an image processing unit, wherein when a size of the original is equal to or smaller than a predetermined size, reading of the original is performed in a regular reading mode in which the first image data is stored in a first storage area of the storage unit though the first input path and the second image data is stored separately in a second storage area of the storage unit though the second input path, and when the size of the original is larger than the predetermined size, the first storage area and the second storage area are regarded as one storage area, and reading of only the first side of the original is performed in a ring buffer mode in which storing of the first image data in the one storage area through the first input path and outputting of the first image data from the one storage area to the image processing unit through the output path are performed in a parallel manner, and when the size of the original is larger than the predetermined size, and it is necessary to read the first and second sides of the original simultaneously, the one storage area is divided into the first storage area for the first side of the original and the second storage area for the second side, image data of an entire area of the first side is stored in the first storage area in the ring buffer mode, and image data of a specified area of the second side is stored in the second storage area.

2. The image reading apparatus according to claim 1, wherein reading of the image of the second side by the second image sensor is disabled while the image of the first side is being read in the ring buffer mode.

3. The image reading apparatus according to claim 1, further comprising an input unit that receives input of information that indicates whether the size of the original is larger than the predetermined size.

4. The image reading apparatus according to claim 2, wherein when an attempt of reading data from the storage unit with no data stored therein is made in a condition where a read rate at which image data is read from the storage unit is higher than a write rate at which image data is stored in the storage unit, it is determined that an anomalous condition has occurred, and a notification about the anomalous condition is issued.

5. The image reading apparatus according to claim 2, wherein when an attempt of storing image data in the storage area from which image data stored therein is not read yet is made in a condition where a read rate at which image data is read from the storage unit is higher than a-write rate at which image data is stored in the storage unit, it is determined that an anomalous condition has occurred, and a notification about the anomalous condition is issued.

6. An image reading method implemented in an image reading apparatus, wherein the image reading apparatus includes:

a first image sensor configured to read an image of a first side of an original thereby acquiring first image data, and a second image sensor configured to read an image of a second side of the original thereby acquiring second image data, wherein reading of the image of the first side of an original by the first image sensor and reading of the image of the second side of the original by the second image sensor can be performed simultaneously;

a storage unit that temporarily stores therein the first image data and the second image data;

a first input path through which the first image data acquired by the first image sensor is output to the storage unit, and a second input path through which the second image data acquired by the second image sensor is output to the storage unit; and an output path through which the first image data and the second image data are output from the storage unit to an image processing unit, and wherein the image reading method comprising comprises:

when a size of the original is equal to or smaller than a predetermined size, performing reading of the original in a regular reading mode in which the first image data is stored in a first storage area of the storage unit though the first input path and the second image data is stored separately in a second storage area of the storage unit though the second input path, and when the size of the original is larger than the predetermined size, the first storage area and the second storage area are regarded as one storage area, and performing reading of only the first side of the original in a ring buffer mode in which storing of the first image data in the one storage area through the first input path and outputting of the first image data from the one storage area to the image processing unit through the output path are performed in a parallel manner, and when the size of the original is larger than the predetermined size, and it is necessary to read the first and second sides of the original simultaneously, the one storage area is divided into the first storage area for the first side of the original and the second storage area for the second side, image data of an entire area of the first side is stored in the first storage area in the ring buffer mode, and image data of a specified area of the second side is stored in the second storage area.

7. The image reading method according to claim 6, further comprising disabling reading of the image of the second side by the second image sensor while the image of the first side is being read in the ring buffer mode.

8. The image reading method according to claim 6, further comprising receiving input of information that indicates whether the size of the original is larger than the predetermined size.

9. The image reading method according to claim 7, further comprising: determining whether an attempt of reading data from the storage unit with no data stored therein is made in a condition where a read rate at which image data is read from the storage unit is higher than a write rate at which image data is stored in the storage unit; and determining that an anomalous condition has occurred when the attempt has been made and issuing a notification that indicates that the anomalous condition has occurred.

10. The image reading method according to claim 7, further comprising: determining whether an attempt of storing image data in a storage area from which image data stored therein is not read yet is made in a condition where a read rate at which image data is read from the storage unit is higher than a write rate at which image data is stored in the storage unit; and determining that an anomalous condition has occurred when the attempt has been made and issuing a notification that indicates that the anomalous condition has occurred.

* * * * *